US011752663B2

(12) United States Patent
Lind et al.

(10) Patent No.: US 11,752,663 B2
(45) Date of Patent: Sep. 12, 2023

(54) PRECISION BEAD FORMING 3D PRINT HEAD FOR CEMENTITIOUS MATERIALS

(71) Applicant: UT-BATTELLE, LLC, Oak Ridge, TN (US)

(72) Inventors: Randall F. Lind, Loudon, TN (US); Brian K. Post, Knoxville, TN (US); Phillip Chesser, Knoxville, TN (US); Celeste Atkins, Clinton, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 69 days.

(21) Appl. No.: 17/039,292

(22) Filed: Sep. 30, 2020

(65) Prior Publication Data

US 2022/0097255 A1 Mar. 31, 2022

(51) Int. Cl.
| | |
|---|---|
| *B28B 1/00* | (2006.01) |
| *B29C 64/209* | (2017.01) |
| *B29C 64/321* | (2017.01) |
| *B33Y 10/00* | (2015.01) |
| *B33Y 30/00* | (2015.01) |
| *B29C 64/241* | (2017.01) |

(Continued)

(52) U.S. Cl.
CPC ............ *B28B 1/001* (2013.01); *B29C 64/209* (2017.08); *B29C 64/241* (2017.08); *B29C 64/321* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B28B 1/001; B29C 64/209; B29C 64/241; B29C 64/321; B29C 64/393; B33Y 10/00; B33Y 30/00; B33Y 50/02

USPC ......................................................... 264/308
See application file for complete search history.

(56) References Cited

U.S. PATENT DOCUMENTS

| | | | | |
|---|---|---|---|---|
| 3,564,651 | A | * | 2/1971 | Covington, Jr. ...... B29C 48/509 425/200 |
| 2005/0196482 | A1 | * | 9/2005 | Khoshnevis .......... B29C 64/106 425/207 |

(Continued)

OTHER PUBLICATIONS

Stefan Gassmann, Lienhard Pagel; Pressure Relief Valve with Permanent Magnets, Nov. 1, 2011, 37th Annual Conference of the IEEE Industrial Electronics Society; 10.1109/IECON.2011.6119978 (Year: 2011).*

*Primary Examiner* — Leith S Shafi
*Assistant Examiner* — Xinwen Ye
(74) *Attorney, Agent, or Firm* — FOX ROTHSCHILD LLP

(57) ABSTRACT

A print head for additive manufacturing with a material includes an accumulator comprising an elongated body with an open interior and an inside diameter. A slide tube is slidably mounted within the open interior of the elongated body. The slide tube has a sealing piston head hermetically sealing the open end within the elongated body to define a variable gas containment space. A pressurized gas is supplied to the gas containment space. A rotatable shaping nozzle with an opening for discharging material is provided. A positive displacement extruder delivers material from the accumulator to the nozzle assembly. The nozzle assembly can include a nozzle rotation drive for rotating the shaping nozzle about an axis of rotation. The nozzle opening can be aligned with the axis of rotation, and defines a discharge axis that can be perpendicular to the axis of rotation. A method of additive manufacturing is also disclosed.

21 Claims, 14 Drawing Sheets

(51) Int. Cl.
*B29C 64/393* (2017.01)
*B33Y 50/02* (2015.01)

(56) References Cited

U.S. PATENT DOCUMENTS

2019/0315016 A1  10/2019  Post et al.
2021/0162651 A1*  6/2021  Schweizer ............. B22F 10/20

* cited by examiner

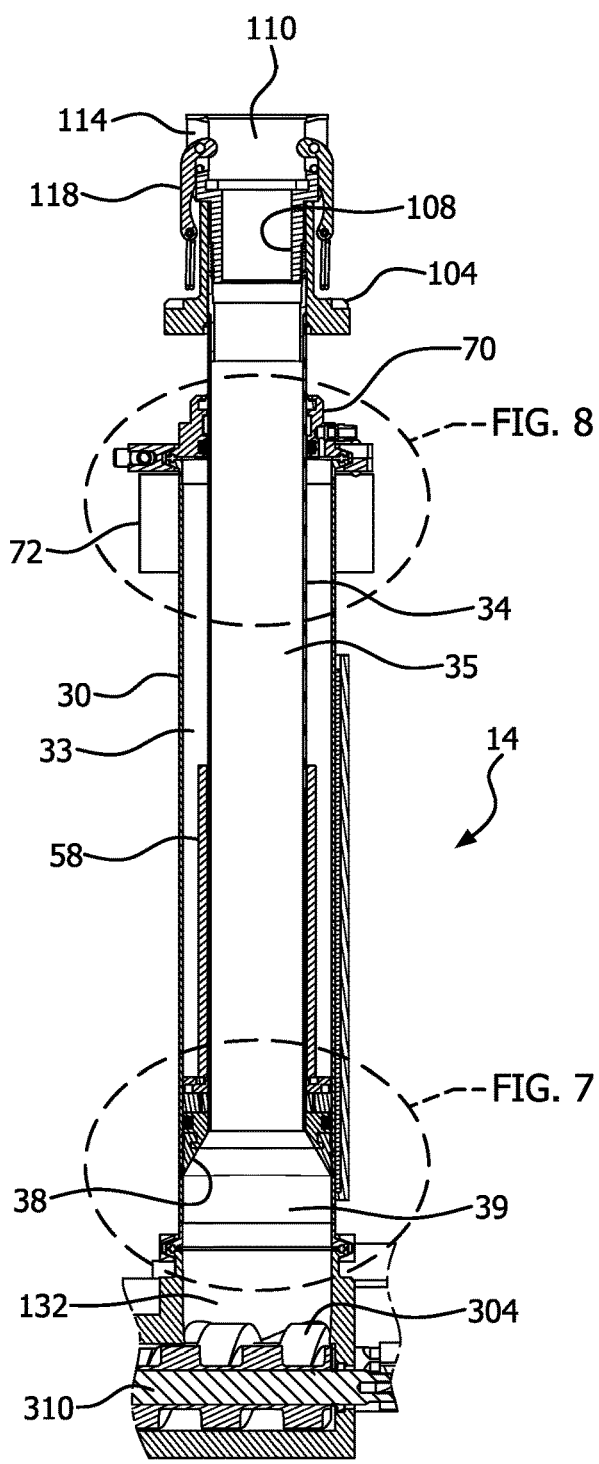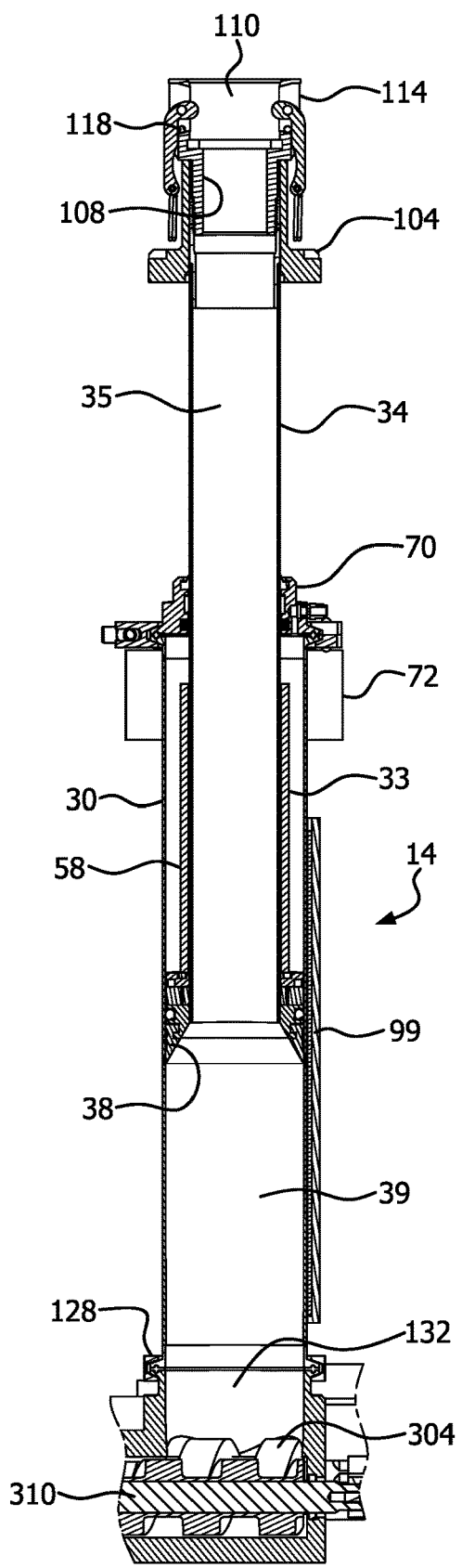
FIG. 5
FIG. 6

PRECISION BEAD FORMING 3D PRINT HEAD FOR CEMENTITIOUS MATERIALS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates to additive manufacturing, and more particularly to a 3-D print head for cementitious and other viscous materials.

BACKGROUND OF THE INVENTION

Manufacturing with cementitious materials has become increasingly popular due to decreased labor requirements and the ability to preprogram the build and to modify the build on-site. One such system is disclosed in US 2019/0315016 ("Cable-Driven Additive Manufacturing System"), the disclosure of which is incorporated fully by reference. This system utilizes a cable-driven additive manufacturing system with a series of base stations and a crane and hoist to change the position of an end effector or print head such as a nozzle capable of depositing concrete.

Concrete and other viscous materials present challenges to supply these materials to the print head. Structures printed with concrete are typically large in dimension, and accordingly the cementitious material must be pumped a great distance, many feet or yards, to the print head in significant volume. The supply of concrete can be slowed, and air pockets can be trapped in the concrete. This results in an irregular supply of concrete to the print head which can result in irregular printing and air pockets trapped in the concrete structure.

SUMMARY OF THE INVENTION

A print head for additive manufacturing with a material includes an accumulator comprising an elongated body with an open interior and an inside diameter. A slide tube is slidably mounted within the open interior of the elongated body. The slide tube includes a conduit for directing the material from a material inlet to a material outlet at an open end of the slide tube. The slide tube can include a sealing piston head surrounding the open end, which forms a sliding hermetic seal between the sliding tube and the elongated body. The slide tube has an outside diameter that is less than the inside diameter of the elongated body, defining a gas containment space. A gas conduit system is provided for receiving pressurized gas and directing the pressurized gas to the gas containment space, and for exhausting pressurized gas from the gas containment space. A nozzle assembly includes a rotatable shaping nozzle with a nozzle opening for discharging the material. An extruder is provided for moving the material from the accumulator to the nozzle assembly. The gas containment space can be annular.

The nozzle assembly can include a nozzle rotation drive for rotating the shaping nozzle about an axis of rotation. The nozzle opening can be aligned with the axis of rotation. The nozzle opening can define a discharge axis, and the discharge axis can be perpendicular to the axis of rotation. The nozzle assembly can also include a registration system for registering the initial position of the nozzle.

The accumulator can include an end cap for closing the annular gas containment space. The end cap can have an opening for slidably receiving a proximal end of the sliding tube. The end cap can further include a seal for hermetically sealing the sliding tube within the end cap opening. The extruder can be a positive displacement twin screw extruder. The screws can have an elastomeric outer covering. The print head assembly can further include a pressure relief fitting that has a magnetic attachment to the assembly. The print head assembly of the invention can be used for materials such as is a cementitious material.

An additive manufacturing assembly for manufacturing with a material can include a print head assembly according to the invention, and can also include a motion device for holding a print head assembly and for moving the print head assembly in three dimensional space during an additive manufacturing process. A source of the material for delivering the material to the print head assembly can be provided. A source of pressurized gas connected to the gas conduit system can further be provided.

A processor can be provided for controlling one or more of the movement of the motion device, the delivery of the material to the print head assembly, the delivery and removal of pressurized gas to the gas containment space, the operation of the extruder, and the rotation of the nozzle assembly. The material can be a cementitious material.

A method of additive manufacturing can include the step of providing a motion device for holding a print head assembly and for moving the print head assembly in three dimensional space during an additive manufacturing process. A print head assembly according to the invention is provided. A source of pressurized gas is connected to a gas conduit system of the print head assembly. A source of the material for delivering the material to the print head assembly is provided. A processor is provided for at least one of controlling the movement of the motion device, the delivery of material to the print head assembly, the delivery and removal of pressurized gas to the gas containment space, the operation of the extruder, and the rotation of the nozzle assembly.

The processor is used to control at least one movement of the motion device, the delivery of material to the print head assembly, the delivery and removal of pressurized gas to the gas containment space, the operation of the extruder, and the rotation of the nozzle assembly according to a predetermined additive manufacturing plan. A cementitious or other material is printed according to instructions programmed into or received by the controller.

BRIEF DESCRIPTION OF THE DRAWINGS

There are shown in the drawings embodiments that are presently preferred it being understood that the invention is not limited to the arrangements and instrumentalities shown, wherein:

FIG. 5 is a cross-section taken along line 5-5 in FIG. 4, in a first mode of operation.

FIG. 6 is a cross-section taken along line 5-5 in FIG. 4, in a second mode of operation.

DETAILED DESCRIPTION OF THE INVENTION

Figure 1:
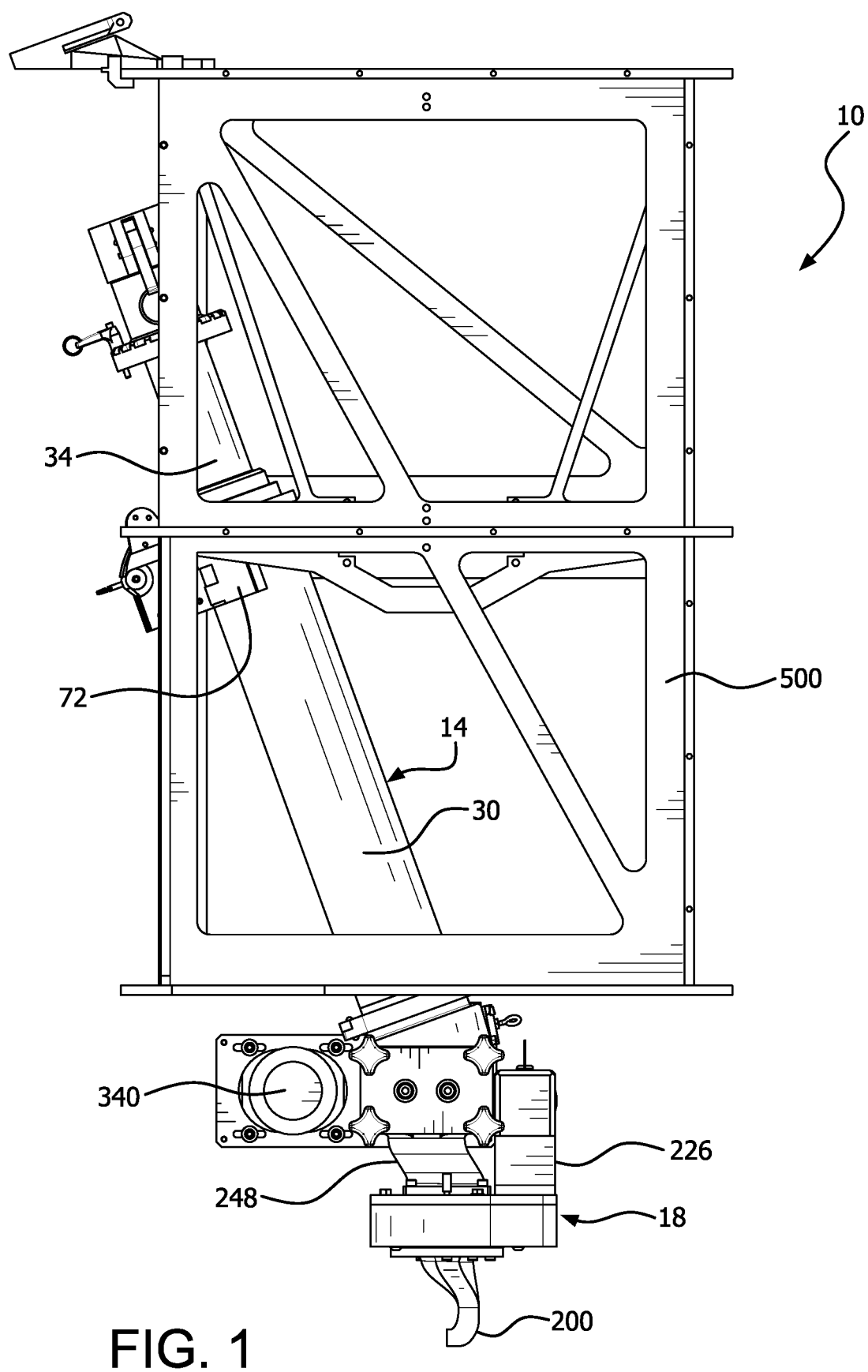
FIG. 1 is a front elevation of a print head assembly for additive manufacturing with cementitious or viscous materials, with a supporting framework.
Figure 2:
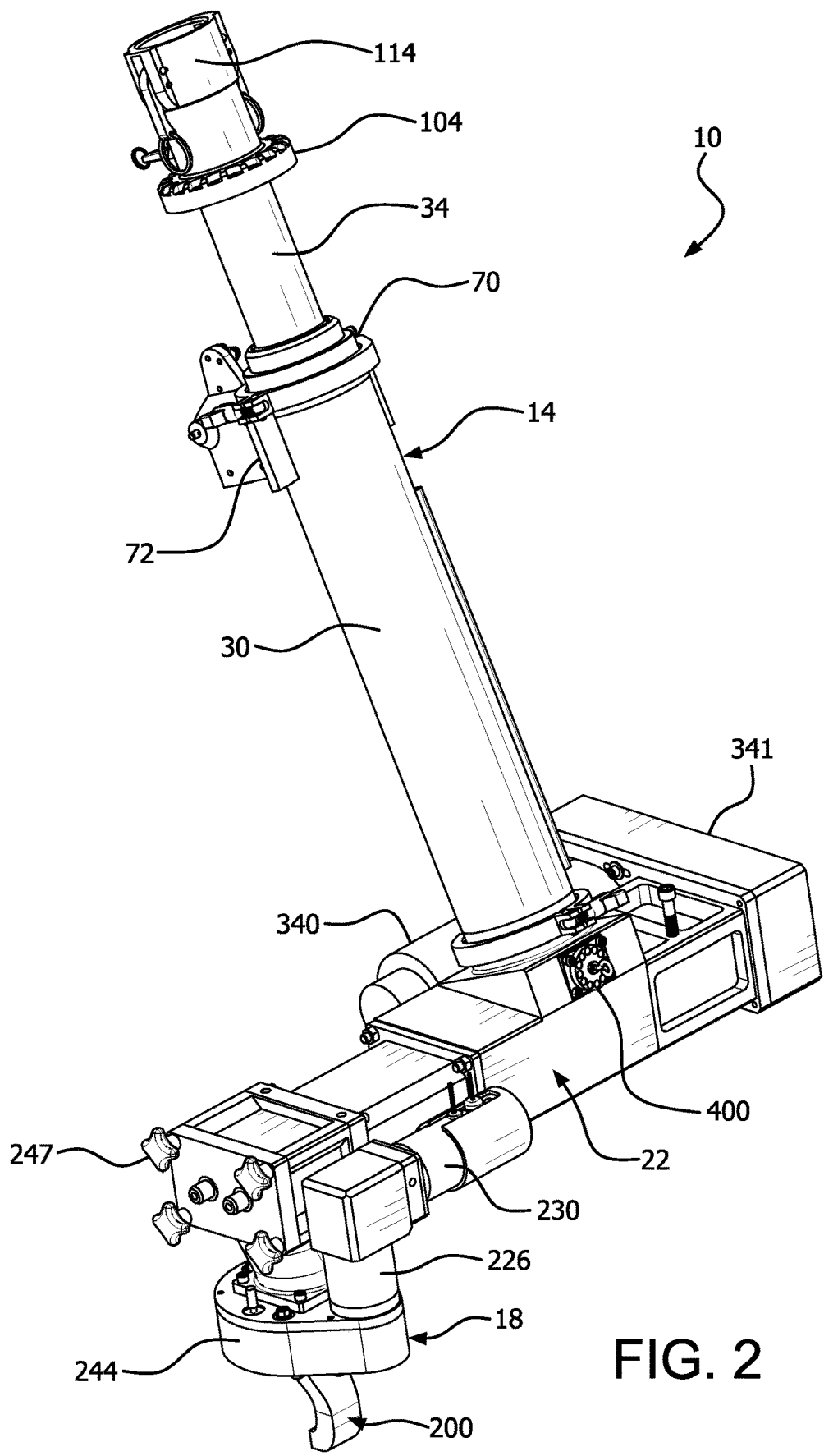
FIG. 2 is a perspective view, without a supporting framework.
Figure 3:
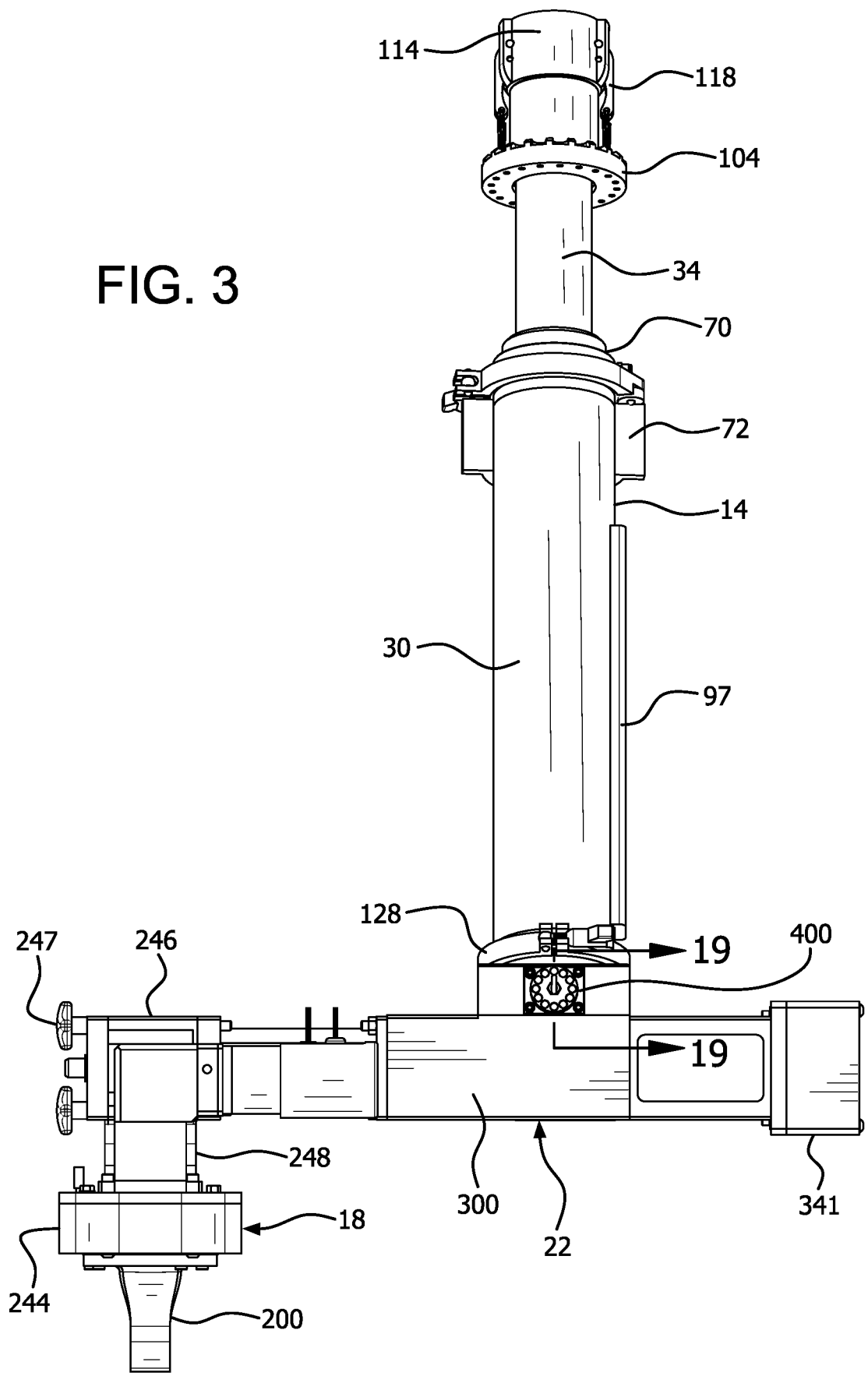
FIG. 3 is a front elevation.
Figure 4:
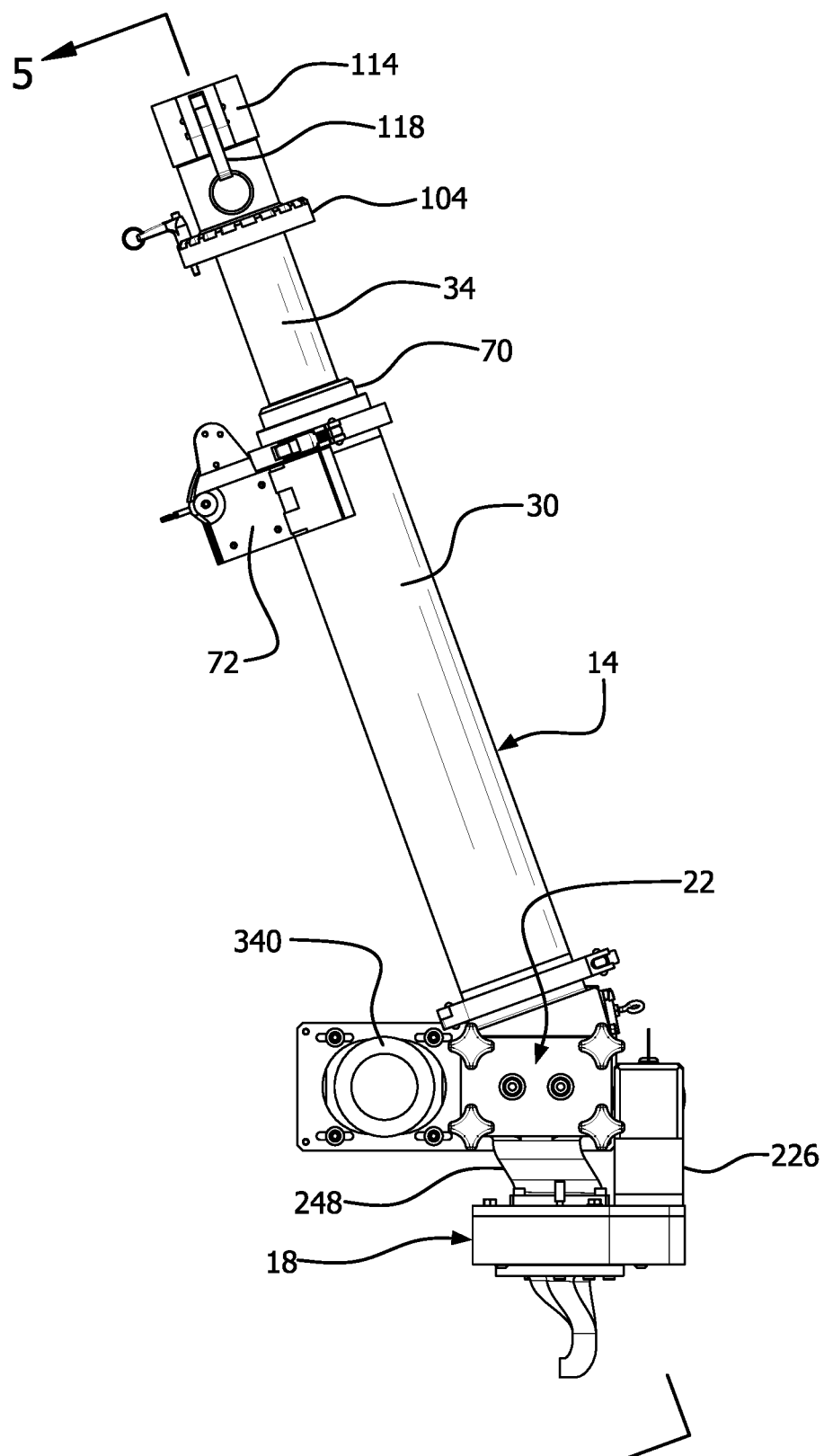
FIG. 4 is a side elevation.
Figure 7:
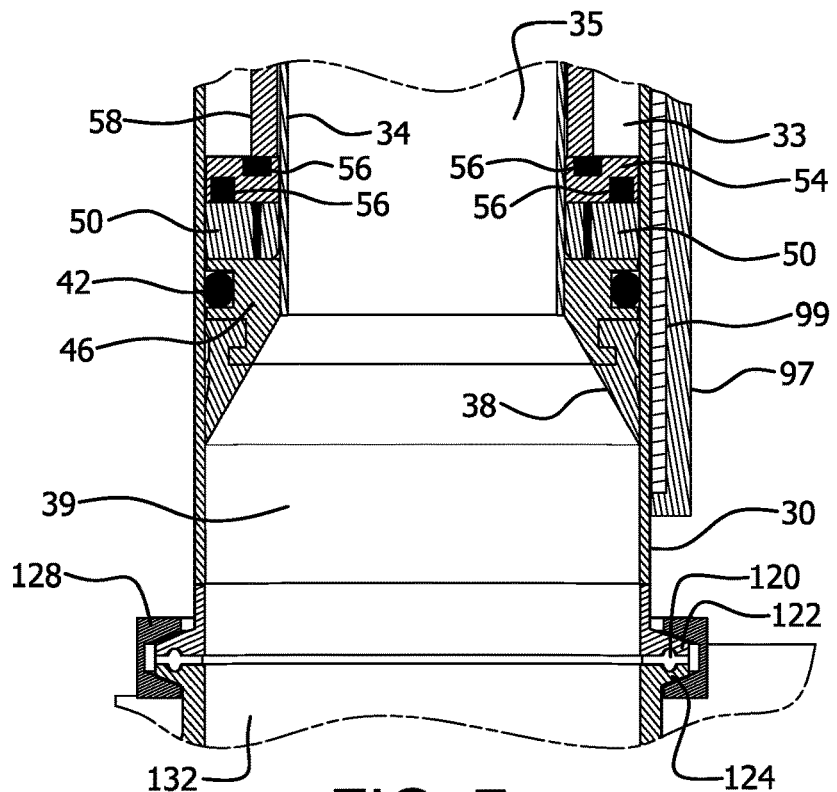
FIG. 7 is an expanded view of area 7 in FIG. 5.
Figure 8:
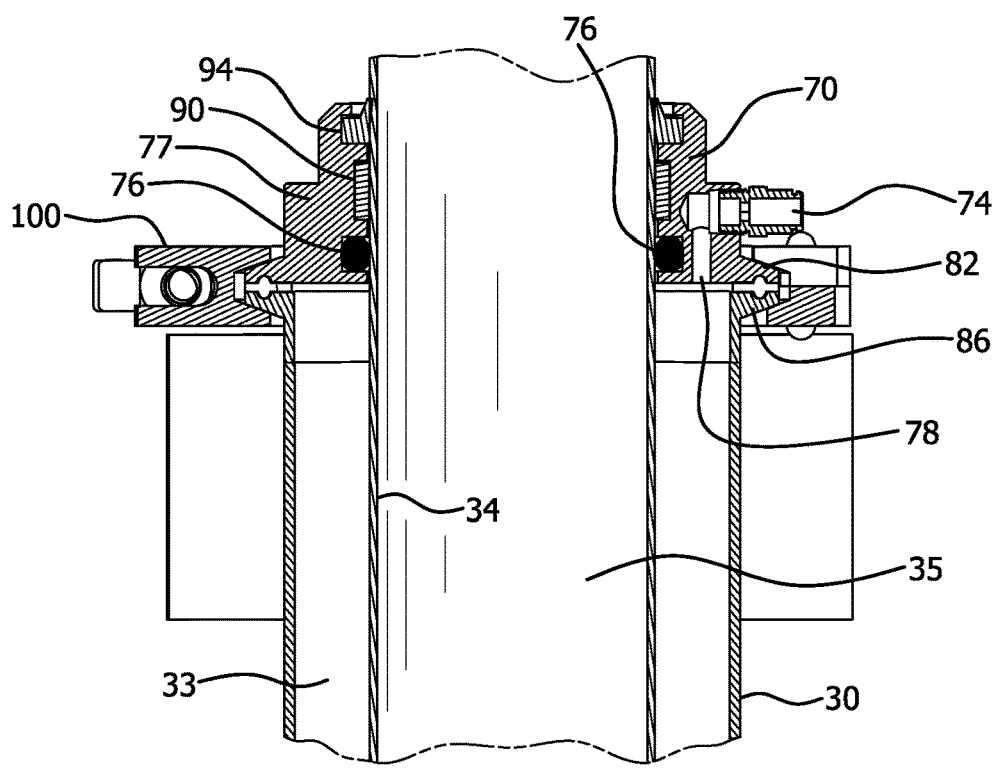
FIG. 8 is an expanded view of area 8 in FIG. 5.

A print head for additive manufacturing with a material includes an accumulator comprising an elongated body with an open interior and an inside diameter. A slide tube is slidably mounted within the open interior of the elongated body. The slide tube includes a conduit for directing the material from a material inlet to a material outlet at an open end of the slide tube. The slide tube also has a sealing piston head surrounding or otherwise hermetically sealing the open end within the elongated body to define a variable gas containment space and to permit the slide tube to move within the elongated body responsive to the material volume in the accumulator. The piston head forms a sliding hermetic seal between the sliding tube and the elongated body. The slide tube has an outside diameter that is less than the inside diameter of the elongated body, defining a gas containment space. The gas containment space can be annular. Other geometries are possible. A gas conduit system is provided for receiving pressurized gas and directing the pressurized gas to the gas containment space, and for exhausting pressurized gas from the gas containment space.

A nozzle assembly includes a rotatable shaping nozzle with a nozzle opening for discharging the material. The nozzle assembly can include a nozzle rotation drive for rotating the shaping nozzle about an axis of rotation. The nozzle opening can be aligned with the axis of rotation. The nozzle opening defines a discharge axis, and the discharge axis can be perpendicular to the axis of rotation. The nozzle assembly can also include a registration system for registering the initial position of the nozzle.

The accumulator can further include an end cap for closing the annular gas containment space. The end cap can have an opening for slidably receiving a proximal end of the sliding tube. The end cap can further Include one or more seals such as o-rings for hermetically sealing the sliding tube within the end cap opening.

An extruder can be provided for moving the material from the accumulator to the nozzle assembly in a controllable and measured fashion. The extruder can be a screw extruder. The extruder can be a positive displacement extruder such as a twin screw extruder. The screws can include an elastomeric outer covering. Other extruder design are possible. Rotor-stator pumps of lobe-type pumps may also be suitable. The extruder/pump should have low pulsations to avoid beads that vary in cross-sectional area.

Pressure can build within the print head assembly. The print head assembly can further include a pressure relief fitting comprising a magnetic attachment to the assembly. If the material pressure becomes too high, the pressure will overcome the magnetic attraction and the fitting will release to permit the escape of material and thereby relieve the pressure.

The print head assembly can be used to print a cementitious material. Other materials and especially viscous materials are possible. The invention can be used to print flowable materials that have some gel strength (non-zero shear strength) after deposition so that the bead can hold its shape and not sag. In addition to cementitious mortars, the invention can be used with materials such as epoxy-based mortars and some polymers.

The additive manufacturing assembly for manufacturing with a material includes a motion device such as a supporting structure, gantry, industrial robot, or cable driven system for holding a print head assembly and for moving the print head assembly in three dimensional space during an additive manufacturing process according to programmed instructions. The motion device can take many forms. The motion device can be a rigid framework such as a gantry, or for example a cable-driven assembly, such as that shown in US 2019/0315016. Suitable industrial robots can include, for example, Cartesian, Cylindrical, SCARA, 6-axis and Delta robots.

A source of the material is provided for delivering the material to the print head assembly. The source can have a pumping system suitable for moving viscous and heavy materials like cement long distances form the source to the print head assembly.

A source of pressurized gas is connected to the gas conduit system. The pressurized gas will typically be air, however, other pressurized gases are possible. A suitable pump for pressurizing the gas can also be provided.

A sensor device can be provided to determine the position of the sliding tube and the piston head within the elongated body. This will provide an indication of the amount of material that has accumulated in the accumulator. Any suitable sensor device can be used. In one embodiment, the sensor comprises magnets provided in the piston head or on the sliding tube, and a magnetic sensor strip on the elongated body to detect the position of the magnets and provide a control signal to a suitable processor.

A processor can be provided for controlling the movement of the print head assembly by the motion device, the delivery of the material to the print head assembly, the delivery and removal of pressurized gas to the gas containment space, the operation of the extruder, and the rotation of the nozzle assembly. Processors and software for 3D printing are known. The invention can utilize a typical industrial automation controller. The accumulator gas pressure can be preset and maintained with a relieving pressure regulator.

A method of additive manufacturing according to the invention includes providing the print head assembly and the motion device for holding the print head assembly and for moving the print head assembly in three dimensional space during an additive manufacturing process. A source of pressurized gas is connected to the gas conduit system, and a source of the material for delivering the material to the print head assembly is provided.

A processor provides instructions for controlling the movement of the motion device, the delivery of material to the print head assembly, the delivery and removal of pressurized gas to the gas containment space, the operation of the extruder, and the rotation of the nozzle assembly. The processor can generate control signals to move the motion device and thereby the print head assembly, to deliver material to the print head assembly, to deliver and remove pressurized gas to the gas containment space, to operate the extruder, and to rotate the nozzle assembly according to a predetermined additive manufacturing plan.

There is shown in the figures a print head assembly 10 according to the invention. The print head assembly 10 includes an accumulator 14, a rotatable nozzle 18, and an extruder assembly 22. The accumulator 14 includes an elongated body 30 with an open interior and an inside diameter. A sliding tube 34 is slidably mounted within the elongated body 30. Both the elongated body 30 and the sliding tube 34 can be tubular, and the sliding tube 34 can be concentrically mounted within the elongated body 30. Other designs are possible.

Space between the elongated body 30 and the sliding tube 34 defines a gas containment space 33. The sliding tube 34 has an open interior 35. At a distal end of the sliding tube 34 it is joined to a piston head 46. The piston head 46 forms a hermetic seal against the elongated body 30 and acts to hermetically seal the gas containment space 33. The piston head 46 also defines an accumulator space 39 within the elongated body 30 on a side of the piston head opposite to the gas containment space 33. The volume of the accumulator space 39 is variable depending on the position of the sliding tube 34 and piston head 46.

The piston head 46 can have different designs. The piston head can include a O-ring seal 42 provided in an O-ring seat. An elastomeric wiper 38 can be connected to the piston head 46 to prevent the material from flowing into the O-ring seal 42. A wear ring 50 can be provided. A registration member 54 can be provided to communicate with other devices to provide an indication of the position of the piston head 46. The registration member 54 can include magnets 56 for position sensing. A stop tube 58 is joined to the sliding tube 34 within the elongated body 30 to keep the slide tube 34 from extending too far.

At the top of the elongated body 30 is an end cap 70 which also forms a sliding seal with the sliding tube 34. The end cap 70 also can have a gas inlet 74 leading to a opening 78 into the gas containment space 33. This can be connected to a source of pressurized gas to pressurize the gas containment space 33, and thereby the piston head 46. The end cap 70 can also include an O-ring 76 provided in an O-ring seat 77. The end cap 70 can include a sealing flange 82. The elongated body 30 can also have a sealing flange 86. The sealing flange 82 and sealing flange 86 can be secured together by a wedge clamp 100. The end cap 70 can further include a wear ring 90 and a elastomeric wiper 94. The end cap 70 can also include a suitable mounting bracket 72 for mounting the print head assembly 10 to a suitable motion device. Other designs are possible.

The accumulator 14 can also include structure for determining the position of the slide tube 34 with respect to the elongated body 30. Magnets 56 can be provided in the registration member 54. A sensor device 97 can include a magnetic detector strip 99 which senses the position of the magnets 56, and thereby the piston head 46. This information can be sent to a control processor.

A proximal end of the sliding tube 34 includes structure for connecting to a material supply conduit. Any suitable structure is possible. One such structure is a connecting fitting 104 with an engagement portion 108 which engages a connecting collar 114 and can be connected or released by engagement tabs 118. The connecting collar 114 has an open interior for the passage of the material.

Figure 9:
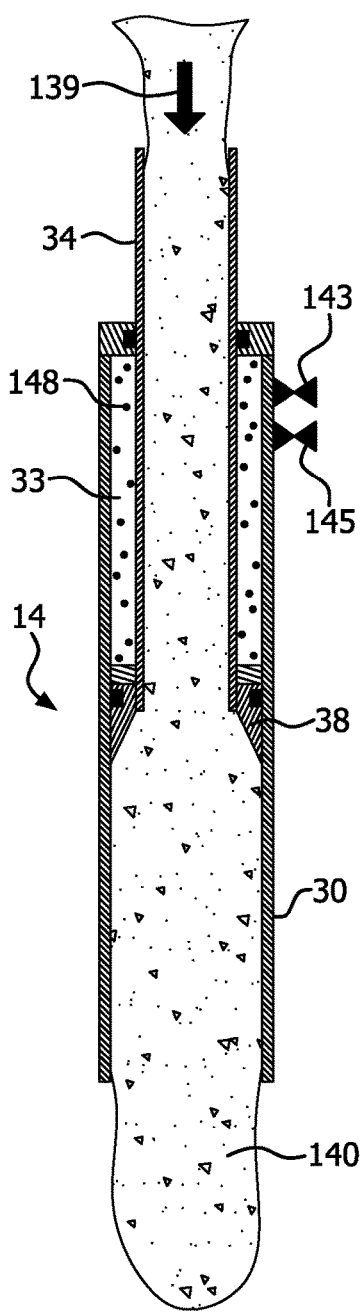
FIG. 9 is a schematic cross-section of an accumulator, in a first mode of operation.
Figure 10:
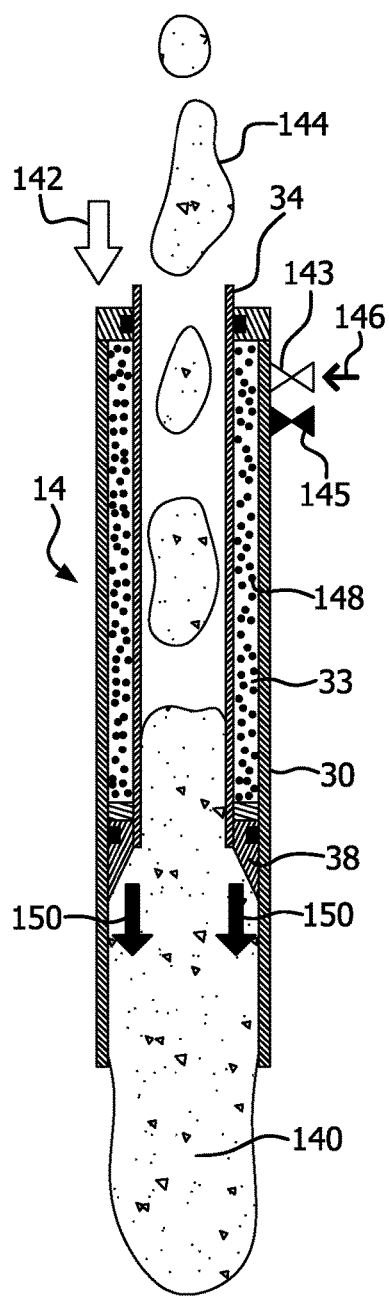
FIG. 10 is a schematic cross-section of an accumulator, in a second mode of operation.
Figure 11:
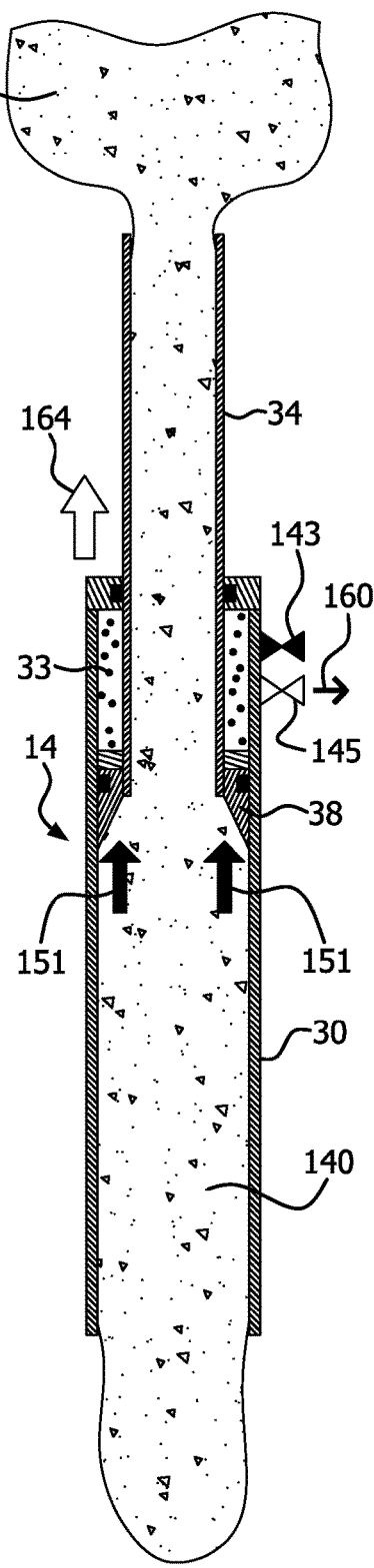
FIG. 11 is a schematic cross-section of an accumulator, in a third mode of operation.

In operation, as shown in FIGS. 9-11, the cementitious material enters the sliding tube 34 as shown by arrow 139 (FIG. 9) and accumulates as it flows past the piston head 46 and forms an accumulated mass 140 of the material. The accumulator 14 can include gas inlet valve 143 and gas outlet valve 145. In a static or steady-state condition, gas is neither added or withdrawn from the gas inlet valve 143 and gas outlet valve 145. As the cementitious material is printed, the accumulated mass 140 of material is withdrawn (FIG. 10). Gas enters the gas containment space 33 through the opened gas inlet valve 143 (indicated by unfilled outline) as shown by arrow 146, while the gas outlet valve remains closed (indicated by a filled outline). The pressure of the gas 148 in the gas containment space 33 increases. The sliding tube 34 and piston head 46 or driven down by the increasing pressure in the gas containment space 33 as shown by arrow 142 and arrows 150. This maintains pressure on the accumulated mass 140 even as the volume of this mass decreases, reducing flow lag and air pockets which might be trapped in the cementitious material 140.

More material must be added to the accumulator 14 as material is printed, and due to the viscous nature of the material the flow of this additional material 144 can be irregular (FIG. 10). The volume of accumulated material will increase as the material flows through the sliding tube 34. As the volume of the accumulated material 140 increases due to excess supply 141, the accumulated material applies pressure to the piston head 46 as shown by arrows 151. This causes the sliding tube 34 to move as shown by arrow 164 to accommodate the increased volume of the accumulated mass 140, while maintaining pressure on the piston head through the gas 148 in the gas containment space 33. The reduction in volume of the gas containment space 33 will have the effect of compressing the gas 148 in the gas containment space 33. This pressure can be released by opening the gas outlet valve 145 and permitting the gas to escape as indicated by arrow 160 (FIG. 11). This pressure release can be automatic, and the gas outlet valve 145 can be a pressure relief valve which opens automatically at a preset gas pressure. This maintains a constant pressure on the accumulated mass even as its volume increases or decreases due to short-term mismatch in inflow and outflow. The accumulator can prevent negative pressure (suction) in the extruder inlet and thereby prevent atmospheric air from being drawn into the material through leaks in the extruder housing. The pressure of the gas can be held very steady with a relieving pressure regulator with sufficient flow capacity. The resulting pressure in the material will vary a small amount due to seal friction.

The accumulator 14 can be connected to the extruder assembly 22 by any suitable structure, such as sealing flanges 122 and 124 and an elastomeric static flange seal 120, secured by a wedge clamp 128 that allows for assembly and disassembly of the accumulator 14. The material leaves the accumulator space 39 and enters a space 132 of the extruder assembly 22. The extruder assembly 22 receives the material 140 from the accumulator 14 and advances it to the nozzle assembly 18 upon receipt of appropriate control signals in accordance with the print plan. The extruder assembly 22 must be capable of careful control of the delivery of the material 140 in both quantity and time, must be capable of stopping the flow of the material 140 to the nozzle assembly 18 upon receipt of a control signal, and must not introduce air into the material 140. To maintain proper bead formation with the material, the rotational velocity of the extruder screws should be linearly proportion to the nozzle translation velocity. The accumulator assures that the extruder has a constant inlet pressure even when the distant material delivery pump is out of sync with extruder due to latency or short flow interruptions. In the invention when used with cementitious materials, the accumulator has been found to provide up to 20 seconds of flow even when the delivery pump is stopped. The accumulator also helps prevent over-pressure of the extruder inlet if the delivery pump is delivering excess flow for a short time.

Figure 12:
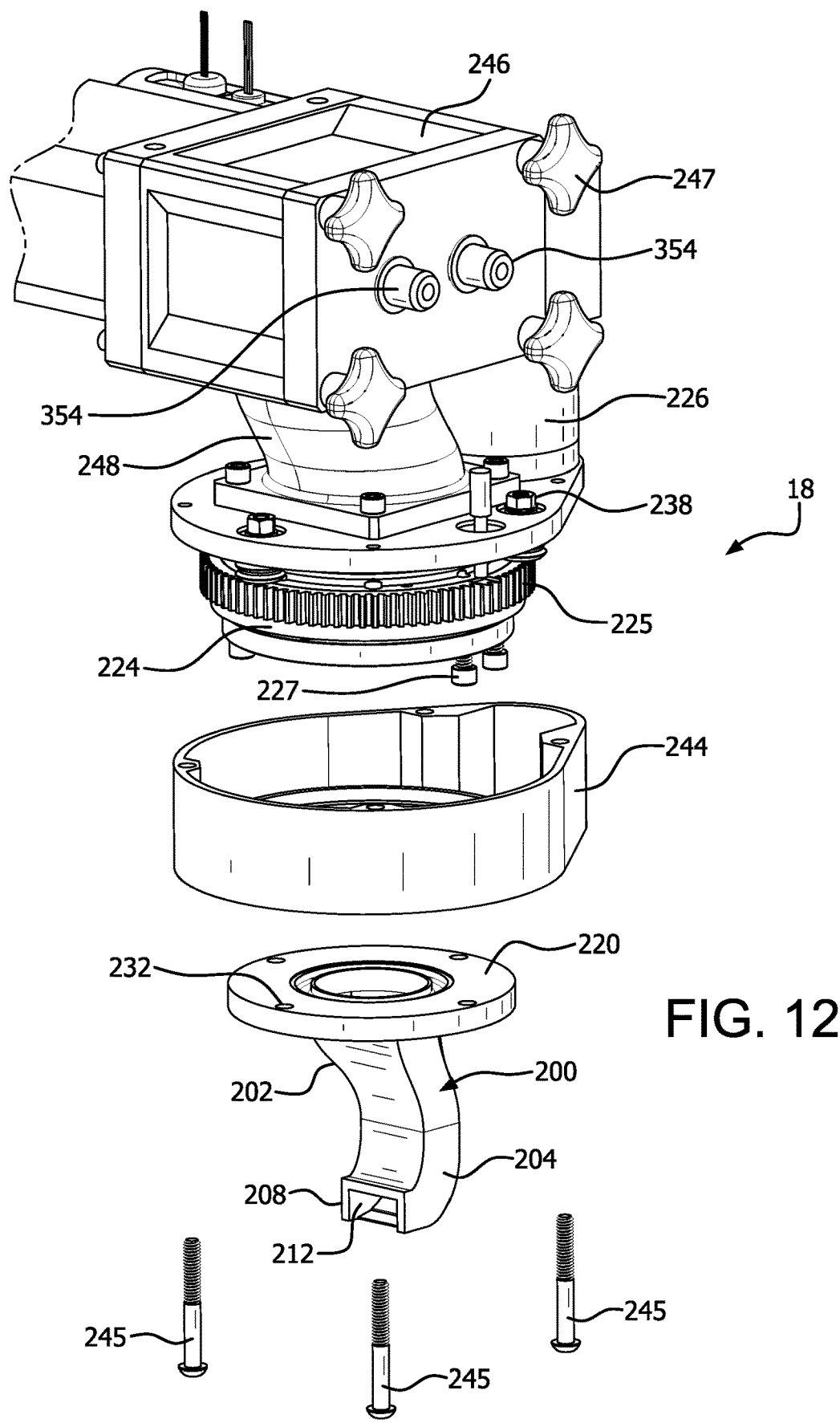
FIG. 12 is an exploded perspective of a rotatable nozzle assembly.
Figure 13:
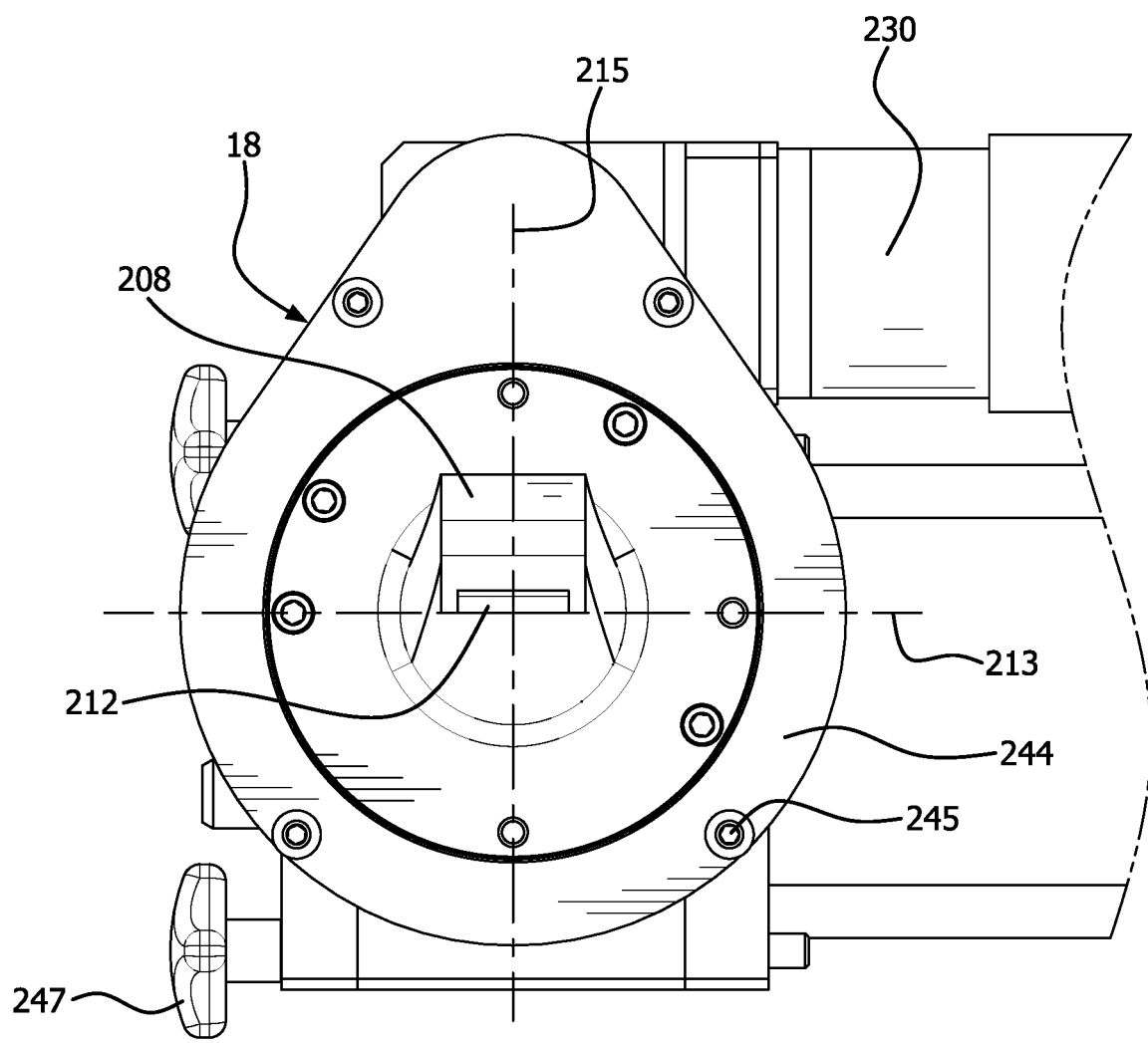
FIG. 13 is a bottom view of a rotatable nozzle assembly.

The material 140 is delivered by the extruder assembly 22 to a rotatable nozzle assembly 18. The nozzle assembly 18 is capable of rotation about an axis, and can deposit the material in a direction that is substantially perpendicular to the axis of rotation. As shown in FIGS. 12-13, the nozzle assembly 18 includes a nozzle 200. The nozzle 200 includes a downwardly extending portion 202, a turn or bend portion 204, and an open end 208 defining a material release opening 212. The nozzle 200 is capable of rotation about an axis defined by the intersection of planes 213 and 215 (FIG. 13). The nozzle 200 includes a rotatable mounting plate 220 which is secured to a rotatable nozzle drive 224. The rotatable nozzle drive 224 can have gear teeth 225 for engaging a gear drive assembly 226 that is connected to a motor 230. Other rotatable designs not including gears are also possible. Mounting bolts 227 can connect to apertures 232 on the mounting plate 220 to secure the mounting plate 222 the rotatable nozzle drive 224. The nozzle assembly can include V-groove rollers 238 which provide axial and radial constraint while allowing rotation of the nozzle. The V-groove rollers 238 engage in a corresponding V-plate. Cross-roller bearings or deep groove ball bearings could also be used. A cover 244 can enclose the rotatable nozzle drive 224 and can be mounted by mounting bolts 245. A conduit 248 transfers the material 140 from the extruder assembly 22 to the nozzle 200. A connecting unit 246 receives the material 140 from the extruder assembly 22 and directs the material into the conduit 248. Removable closure bolts 247 can be provided to permit access to the connecting unit 246.

Figure 14:
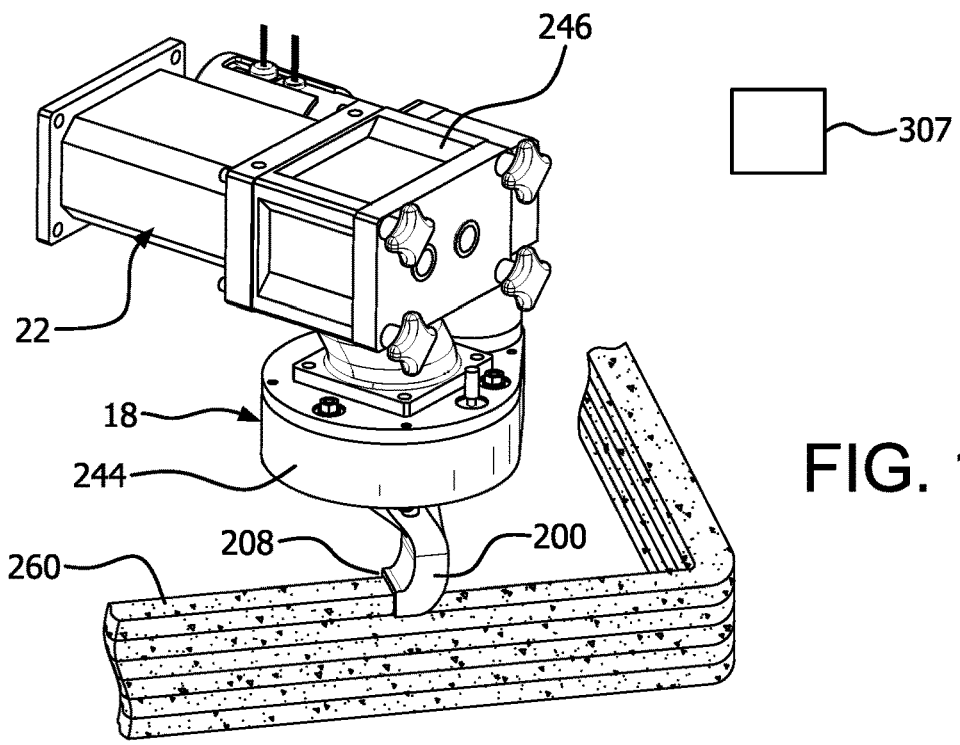
FIG. 14 is a perspective view of the rotatable nozzle assembly, in a first mode of operation.
Figure 15:
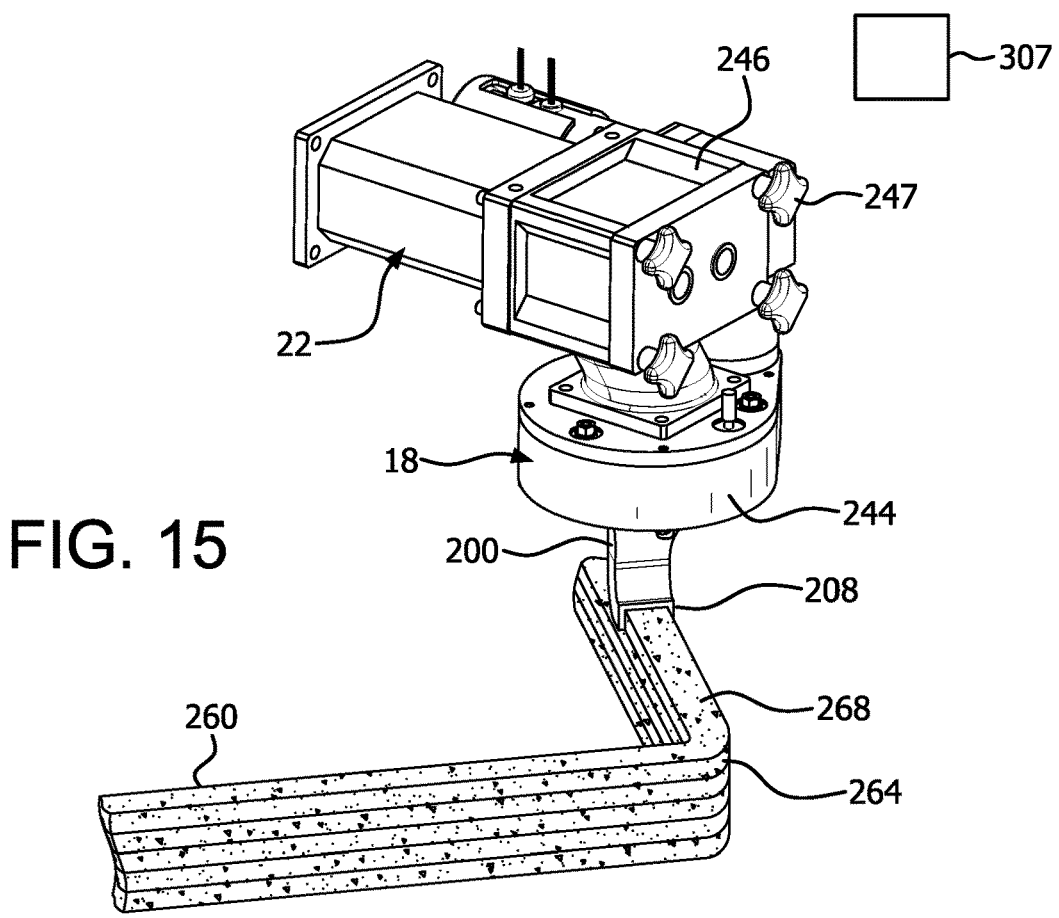
FIG. 15 is a perspective view of the rotatable nozzle assembly, in a second mode of operation.

Operation of the rotatable nozzle is shown in FIGS. 14-15. The nozzle assembly 18 is moved by a motion device (not shown) according to control signals received from a suitable processor 307, either by a wired or wireless connection. A bead 260 of the material 140 is deposited in a first direction through the open end 208 of the nozzle 200. As the nozzle 200 reaches a required turn 264, control signals from the processor cause rotation of the nozzle through the turn 264 and a bead 268 is deposited in a different direction without interruption. The depositing of the material 140 can be controlled by the processor 307 through operation of the extruder assembly 22, the accumulator 14 and a supply source of the material 140 to the accumulator 14 such as a cement pump (not shown).

Figure 16:
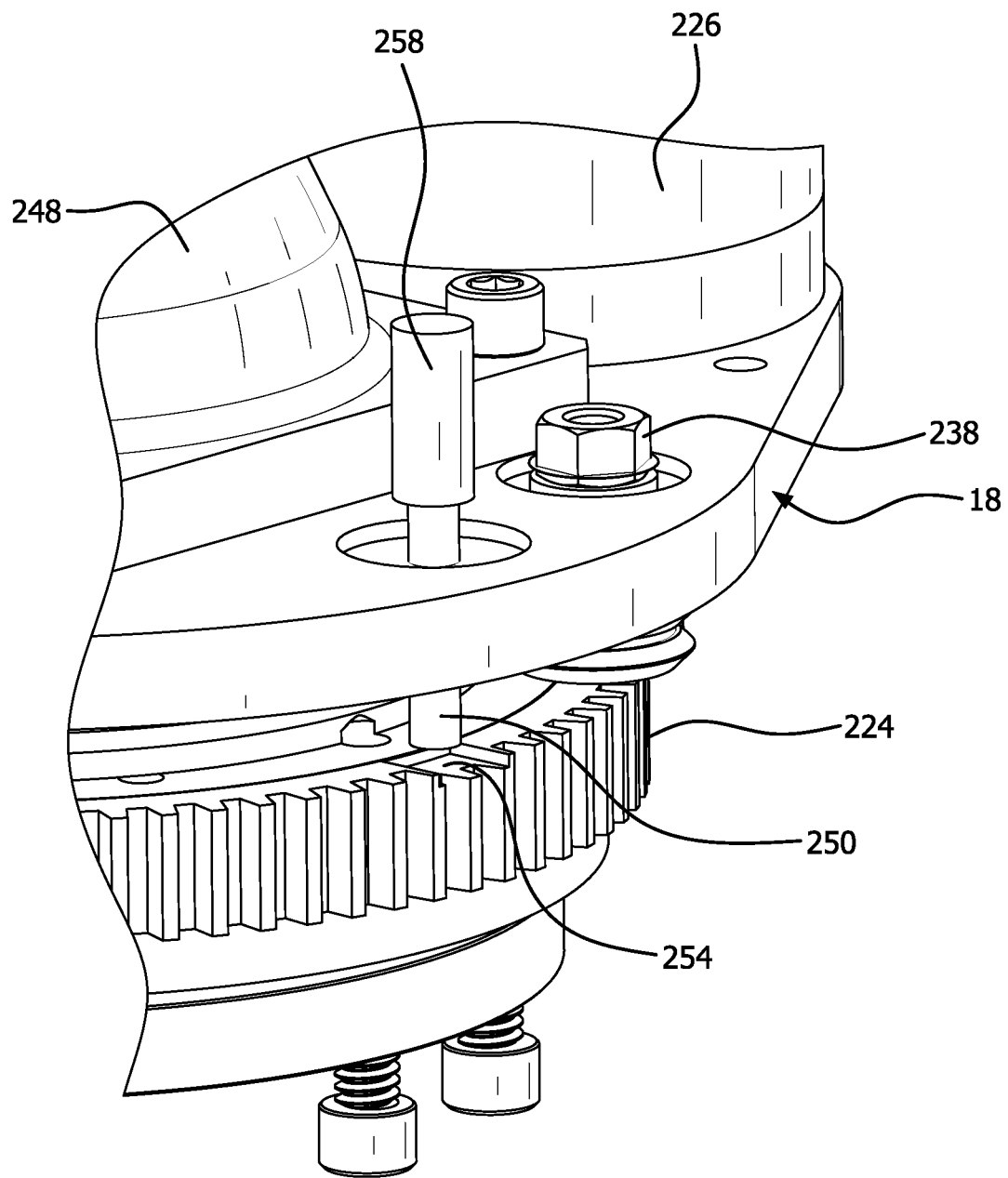
FIG. 16 is a perspective view of a registration device for the rotatable nozzle assembly.

The processor 307 sends directional signals to the rotatable nozzle assembly 18, and therefore registration of the position of the nozzle 200 must be known. For purposes of calibration, an initial registration assembly is desirable. Different registration systems are possible. One such system is shown in FIG. 16 and includes a magnetic proximity sensor 258 and arm 250 which cooperate with the rotatable nozzle drive 224 to determine the position of the rotatable nozzle drive 224 and thereby the nozzle 200. A radial groove 254 can be cut in the face of an upper surface of the rotatable nozzle drive 224. The radial groove 254 is detected by the proximity sensor 258 once per rotation of the nozzle drive 224 and gear 225.

The processor 307 also can be used to control the operation of the extruder assembly 22, the pressure in the gas containment space 33, and the delivery of material to the print head assembly 10.

Figure 17:
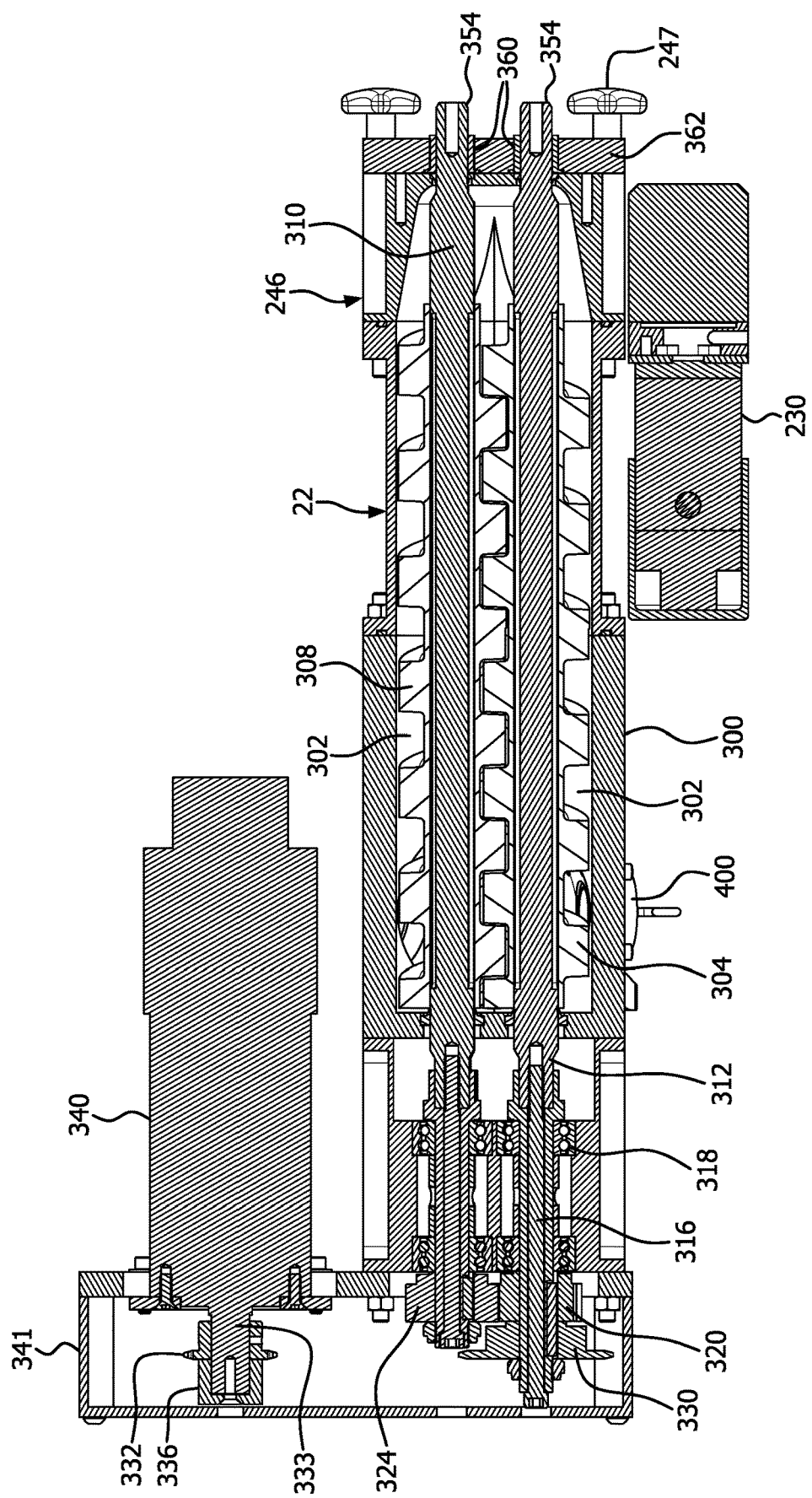
FIG. 17 is a cross section of an extruder assembly.
Figure 18:
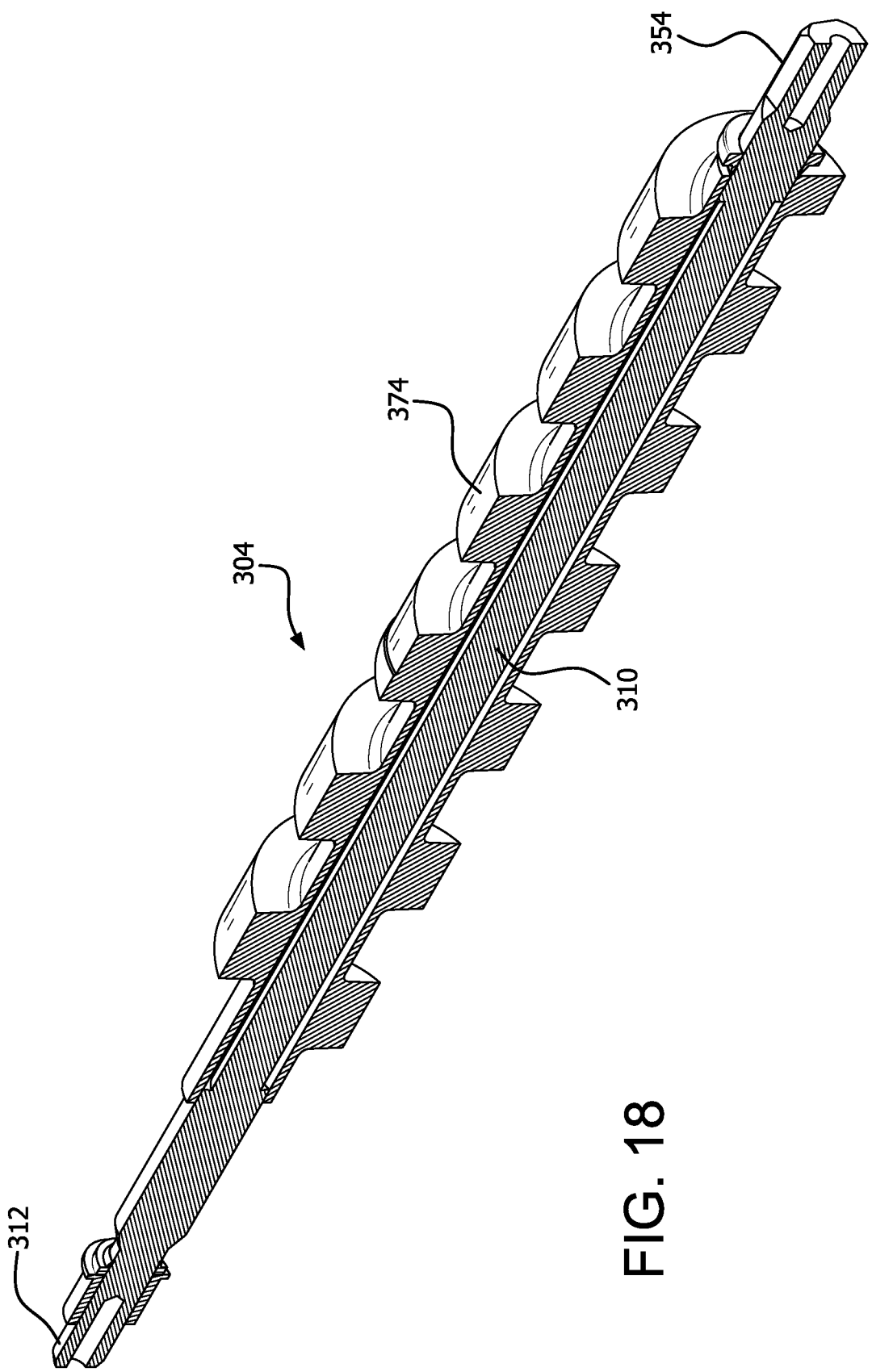
FIG. 18 is a cross-section of an extruder screw.

The extruder assembly 22 is shown in FIGS. 17-18. Different extruder designs are possible, however, a positive displacement twin screw extruder as shown has advantages for moving viscous materials such as cementitious materials. The twin screw extruder can have a housing 300 defining an open interior 302 in which twin screws 304 and 308 are rotatably mounted with the screws intertwining in known fashion. The screws have a central shaft 310 with a mounting end 312 which engages a spindle 316. Suitable bearings 318 can be provided to facilitate rotation. Gears 320 and 324 which drive the screws 304 and 308 engage with a gear drive 330. The gear drive 330 is engaged by suitable structures such as a drive chain (not shown) to a sprocket 332 that is connected to a rotatable shaft 333 of a drive motor 340. The rotatable shaft 333 can be supported in a bracket 336. A housing 341 can be provided to enclose the sprockets drive chain and gears of the extruder assembly 22. The central shaft 310 of the twin screws 304 and 308 can include a spindle 354 which is mounted in brackets 360 in end plate 362 of the connecting unit 246.

The screws 304 and 308 of the twin screw extruder assembly 22 can be specially adapted for cementitious and viscous materials. Cementitious materials in particular in addition to being viscous contain aggregate which can rapidly degrade the screws of an extruder. An elastomeric covering 374 is positioned on the turning shaft 310 that is made of a suitable elastomeric material (FIG. 18). The elastomeric material gives upon contact with the aggregate and other abrasives, but has the requisite stiffness to advance the viscous material. The extruder screws 304 and 308 are counter-rotating, square profile, intermeshing helixes. They create cavities 302 that translate axially while the screws rotate. These cavities move material through the housing 300. The elastomeric covering 374 allows close fitting surfaces (for low leakage) but can pass some larger aggregates without jamming.

Figure 19:
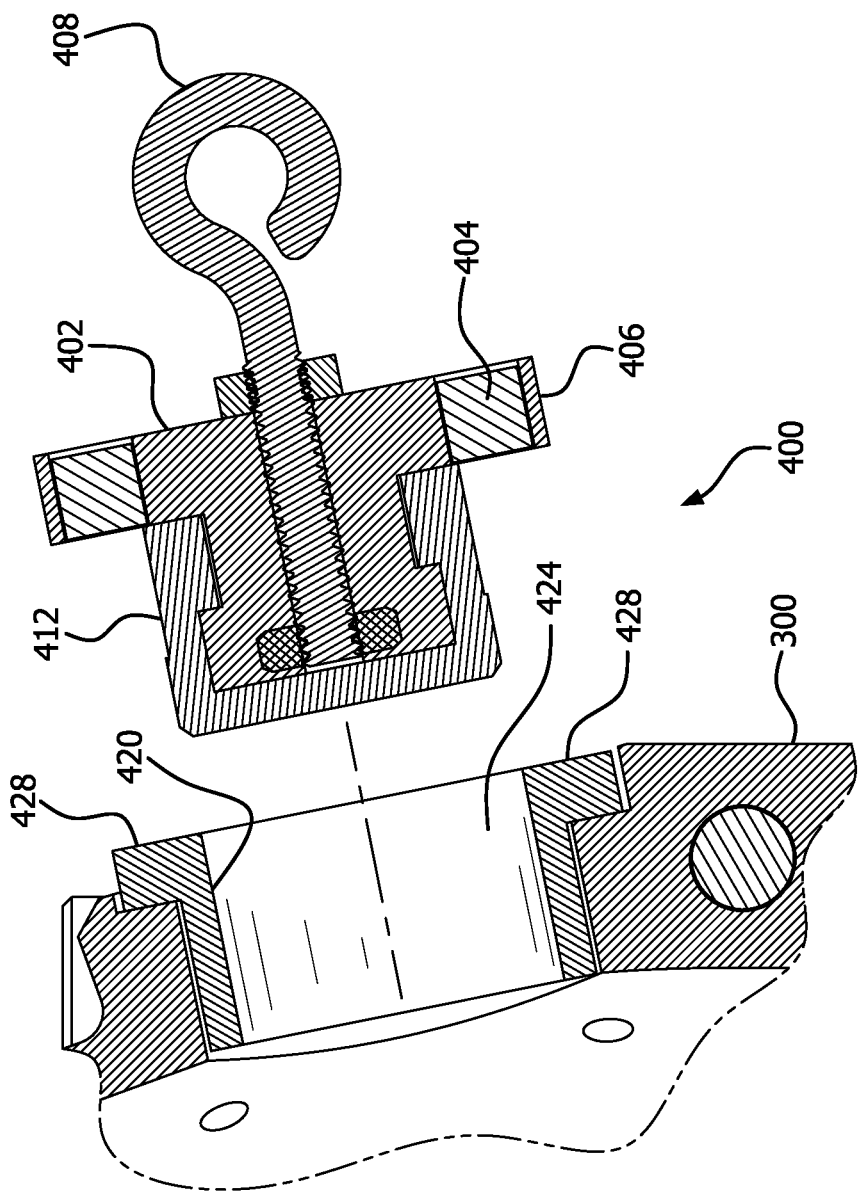
FIG. 19 is an exploded cross-section of a pressure relief fitting.

Undesirable pressures can sometimes build within the print head assembly 10. Devices to relieve undesirable pressure can be provided. In FIG. 19 there is shown a pressure relieving device 400 comprising a plug assembly 402 which has a series of magnets 404 in a flange portion 406. A handle such as eyebolt 408 can be provided. An outer cover 412 is adapted to engage a fitting 420 provided in the extruder housing 300. The fitting 420 defines a central opening 424. The cover 412 is dimensioned to be tightly received within the opening 424, with the flange portion 406 abutting a flange portion 428 of the fitting 420. The flange portion 428 comprises a ferrous material which attracts the magnets 406. A pressure buildup of the cementitious material within the extruder assembly 22 will overcome the attraction of the magnets to the flange portion 428 and release the plug assembly 402 from the fitting 420 to relieve the pressure. The number and strength of the magnets 404 can be varied to adjust the pressure at which the plug assembly 402 will release from the fitting 420. Other pressure relieving structure is possible.

The print head assembly can be used with different motion devices. A mounting structure 500 can be used to connect to the mounting bracket 72 of the print head assembly 10 and to the motion device. The design of the mounting structure can be varied to suit the type of motion device that is being used.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A print head for additive manufacturing with a material, comprising:
    an accumulator comprising an elongated body with an open interior and an inside diameter; a slide tube slidably mounted within the open interior of the elongated body, the elongated body having a distal material outlet, the slide tube comprising a conduit for directing the material from a slide tube material inlet to a slide tube material outlet at an open end of the slide tube, the slide tube comprising a sealing piston head having an axial passageway defining the open end, the piston head forming a sliding hermetic seal between the sliding tube and the elongated body, the slide tube having an outside diameter that is less than the inside diameter of the elongated body, the slide tube, elongated body and sealing piston head defining a gas containment space and the sealing piston head and elongated body distally defining an accumulator space between the piston head and the distal material outlet of the elongated body, a gas conduit system for receiving pressurized gas and directing the pressurized gas to the gas containment space, and for exhausting pressurized gas from the gas containment space;
    wherein the gas conduit system is configured such that pressurized gas in the gas containment space will apply pressure to the piston head, the piston head will apply pressure to the material in the accumulator space, and wherein the hermetic seal and the gas conduit system are configured to prevent the pressurized gas from entering the accumulator space and thereby the material, and the pressure applied by the piston head to the material will drive the material through the distal material outlet of the elongated body and material will flow through the axial passageway of the piston head;
    a nozzle assembly comprising a rotatable shaping nozzle with a nozzle opening for discharging the material; and,
    an extruder for moving the material from the accumulator to the nozzle assembly.

2. The print head assembly of claim 1, wherein the nozzle assembly further comprises a nozzle rotation drive for rotating the shaping nozzle about an axis of rotation.

3. The print head assembly of claim 2, wherein the nozzle opening is aligned with the axis of rotation.

4. The print head assembly of claim 2, wherein the nozzle opening defines a discharge axis, and wherein the discharge axis is perpendicular to the axis of rotation.

5. The print head assembly of claim 2, wherein the nozzle assembly further comprises a registration system for registering the initial position of the nozzle.

6. The print head assembly of claim 1, wherein the accumulator further comprises a proximal end with an end cap for closing the gas containment space, the end cap having an opening for slidably receiving a proximal end of the sliding tube, the end cap further comprising a seal for hermetically sealing the sliding tube within the end cap opening.

7. The print head assembly of claim 1, wherein the gas containment space is annular.

8. The print head assembly of claim 1, wherein the extruder is a positive displacement twin screw extruder.

9. The print head assembly of claim 1, wherein the extruder is a screw extruder with a screw, the screw comprising an elastomeric outer covering.

10. The print head assembly of claim 1, further comprising a pressure relief fitting comprising a magnetic attachment to the assembly.

11. The print head assembly of claim 1, wherein the material is a cementitious material.

12. An additive manufacturing assembly for manufacturing with a material, comprising:
    a motion device for holding a print head assembly and for moving the print head assembly in three dimensional space during an additive manufacturing process;
    the print head assembly comprising an accumulator comprising an elongated body with an open interior and an inside diameter; a slide tube slidably mounted within the open interior of the elongated body, the elongated body having a distal material outlet, the slide tube comprising a conduit for directing the material from a slide tube material inlet to a slide tube material outlet at an open end of the slide tube, the slide tube comprising a sealing piston head having an axial passageway defining the open end, the piston head forming a sliding hermetic seal between the sliding tube and the elongated body, the slide tube having an outside diameter that is less than the inside diameter of the elongated body, the slide tube, elongated body and sealing piston head defining a gas containment space and the sealing piston head and elongated body distally defining an accumulator space between the piston head and the distal material outlet of the elongated body, a gas conduit system for receiving pressurized gas and directing the pressurized gas to the gas containment space, and for exhausting pressurized gas from the gas containment space;
    wherein the gas conduit system is configured such that pressurized gas in the gas containment space will apply pressure to the piston head, the piston head will apply pressure to the material in the accumulator space, and wherein the hermetic seal and the gas conduit system are configured to prevent the pressurized gas from entering the accumulator space and thereby the material, and the pressure applied by the piston head to the material will drive the material through the distal material outlet of the elongated body and material will flow through the axial passageway of the piston head;
    a nozzle assembly comprising a rotatable shaping nozzle with a nozzle opening for discharging the material; and
    an extruder for moving the material from the accumulator to the nozzle assembly;
    a source of the material for delivering the material to the print head assembly;

a source of pressurized gas connected to the gas conduit system; and, a processor for controlling at least one selected from the group consisting of the movement of the motion device, the delivery of the material to the print head assembly, the delivery and removal of pressurized gas to the gas containment space, the operation of the extruder, and the rotation of the nozzle assembly.

13. The additive manufacturing assembly of claim 12, wherein the material is a cementitious material.

14. A method of additive manufacturing, comprising the steps of:

providing a motion device for holding a print head assembly and for moving the print head assembly in three dimensional space during an additive manufacturing process;

providing a print head assembly comprising an accumulator comprising an elongated body with an open interior and an inside diameter; a slide tube slidably mounted within the open interior of the elongated body, the elongated body having a distal material outlet, the slide tube comprising a conduit for directing the material from a slide tube material inlet to a slide tube material outlet at an open end of the slide tube, the slide tube comprising a sealing piston head having an axial passageway defining the open end, the piston head forming a sliding hermetic seal between the sliding tube and the elongated body, the slide tube having an outside diameter that is less than the inside diameter of the elongated body, the slide tube, elongated body and sealing piston head defining a gas containment space and the sealing piston head and elongated body distally defining an accumulator space between the piston head and the distal material outlet of the elongated body, providing a gas conduit system for receiving pressurized gas and directing the pressurized gas to the gas containment space, and for exhausting pressurized gas from the gas containment space;

wherein the gas conduit system is configured such that pressurized gas in the gas containment space will apply pressure to the piston head, the piston head will apply pressure to the material in the accumulator space, and wherein the hermetic seal and the gas conduit system are configured to prevent the pressurized gas from entering the accumulator space and thereby the material, and the pressure applied by the piston head to the material will drive the material through the distal material outlet of the elongated body and material will flow through the axial passageway of the piston head;

providing a nozzle assembly comprising a rotatable shaping nozzle with a nozzle opening for discharging the material; and providing an extruder for moving the material from the accumulator to the nozzle assembly;

providing a source of pressurized gas connected to the gas conduit system;

providing a source of the material for delivering the material to the print head assembly; and providing a processor for controlling at least one selected from the group consisting of the movement of the motion device, the delivery of material to the print head assembly, the delivery and removal of pressurized gas to the gas containment space, the operation of the extruder, and the rotation of the nozzle assembly;

using the processor to control at least one selected from the group consisting of movement of the motion device, the delivery of material to the print head assembly, the delivery and removal of pressurized gas to the gas containment space, the operation of the extruder, and the rotation of the nozzle assembly according to a predetermined additive manufacturing plan.

15. The method of claim 14, wherein the material is a cementitious material.

16. The print head assembly of claim 1, further comprising a pressure sensor for sensing the pressure in the gas containment space; and a processor for controlling the gas conduit system responsive to the sensing of pressure by the pressure sensor.

17. The additive manufacturing assembly of claim 12, further comprising a pressure sensor for sensing the pressure in the gas containment space, and communicating the sensed pressure to the processor for controlling the gas conduit system responsive to the sensing of pressure by the pressure sensor.

18. The method of claim 14, further comprising the steps of sensing the pressure in the gas containment space with a pressure sensor, the pressure sensor communicating the sensed pressure to the processor, and using the processor to control the gas conduit system responsive to the sensing of pressure by the pressure sensor.

19. The print head assembly of claim 1, wherein the piston head and the gas containment space are annular.

20. The additive manufacturing assembly of claim 12, wherein the piston head and the gas containment space are annular.

21. The method of claim 14, wherein the piston head and the gas containment space are annular.

* * * * *